United States Patent
Winegarden et al.

(10) Patent No.: US 9,124,524 B2
(45) Date of Patent: Sep. 1, 2015

(54) SYSTEM AND METHOD FOR PRIORITY BASED FLOW CONTROL BETWEEN NODES

(75) Inventors: Colin Winegarden, Cary, NC (US); Daniel Kelley, San Jose, CA (US); Biju Babu, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 284 days.

(21) Appl. No.: 13/219,210

(22) Filed: Aug. 26, 2011

(65) Prior Publication Data

US 2013/0003550 A1    Jan. 3, 2013

Related U.S. Application Data

(60) Provisional application No. 61/502,393, filed on Jun. 29, 2011.

(51) Int. Cl.
| | |
|---|---|
| H04L 12/701 | (2013.01) |
| H04L 12/705 | (2013.01) |
| H04L 12/733 | (2013.01) |
| H04L 12/725 | (2013.01) |
| H04L 12/753 | (2013.01) |
| H04L 12/751 | (2013.01) |
| H04L 12/54 | (2013.01) |

(52) U.S. Cl.
CPC ............... *H04L 45/302* (2013.01); *H04L 12/56* (2013.01); *H04L 45/00* (2013.01); *H04L 45/02* (2013.01); *H04L 45/122* (2013.01); *H04L 45/18* (2013.01); *H04L 45/48* (2013.01)

(58) Field of Classification Search
USPC .............. 370/230, 230.1, 231, 235, 238, 254, 370/256, 400, 401, 408
See application file for complete search history.

(56) References Cited

U.S. PATENT DOCUMENTS

| | | | |
|---|---|---|---|
| 2001/0030969 A1* | 10/2001 | Donaghey et al. | 370/397 |
| 2002/0009088 A1* | 1/2002 | Donaghey et al. | 370/397 |
| 2002/0023170 A1* | 2/2002 | Seaman et al. | 709/235 |
| 2002/0031089 A1* | 3/2002 | Elloumi et al. | 370/235 |
| 2002/0122387 A1* | 9/2002 | Ni | 370/231 |
| 2002/0196745 A1* | 12/2002 | Frouin et al. | 370/254 |
| 2004/0160904 A1* | 8/2004 | Enomoto et al. | 370/256 |
| 2004/0190536 A1* | 9/2004 | Wang | 370/401 |
| 2004/0240398 A1* | 12/2004 | Ho et al. | 370/256 |
| 2005/0041676 A1* | 2/2005 | Weinstein et al. | 370/401 |
| 2005/0078610 A1* | 4/2005 | Previdi et al. | 370/254 |
| 2005/0094568 A1* | 5/2005 | Judd | 370/242 |
| 2005/0111349 A1* | 5/2005 | Vasseur et al. | 370/216 |

(Continued)

FOREIGN PATENT DOCUMENTS

EP    1732271 A1 *  12/2006

*Primary Examiner* — Jenee Williams
(74) *Attorney, Agent, or Firm* — Foley & Lardner LLP; Christopher J. McKenna; Daniel E. Rose

(57) ABSTRACT

A system and method for priority-based flow control between nodes. In one example, pause deadlocks in a physical loop can be averted by priority-based selection of egress ports to which a packet is forwarded. In one embodiment, if the packet priority matches a configured lossless priority, then the set of internal egress ports is masked such that only the internal ports belonging to the spanning tree remain in the set of internal egress ports. If the packet priority does not match a configured lossless priority, then the set of internal egress ports is masked such that only the internal ports belonging to the shortest path first tree remain in the set of internal egress ports.

11 Claims, 6 Drawing Sheets

(56) References Cited

U.S. PATENT DOCUMENTS

| | | | |
|---|---|---|---|
| 2005/0265239 A1* | 12/2005 | Previdi et al. | 370/238 |
| 2006/0002292 A1* | 1/2006 | Chang et al. | 370/225 |
| 2006/0114831 A1* | 6/2006 | Buduma et al. | 370/241 |
| 2006/0239211 A1* | 10/2006 | Previdi | 370/256 |
| 2007/0121524 A1* | 5/2007 | Rangarajan et al. | 370/252 |
| 2007/0159983 A1* | 7/2007 | Eglin et al. | 370/254 |
| 2007/0165657 A1* | 7/2007 | Smith et al. | 370/401 |
| 2008/0137557 A1* | 6/2008 | Nozue et al. | 370/256 |
| 2008/0165704 A1* | 7/2008 | Marchetti et al. | 370/256 |
| 2009/0161584 A1* | 6/2009 | Guan | 370/256 |
| 2010/0054157 A1* | 3/2010 | Farkas et al. | 370/256 |
| 2010/0232322 A1* | 9/2010 | Umayabashi et al. | 370/256 |
| 2011/0069626 A1* | 3/2011 | Sun et al. | 370/252 |
| 2011/0305167 A1* | 12/2011 | Koide | 370/255 |
| 2012/0051252 A1* | 3/2012 | Iwao et al. | 370/252 |
| 2012/0063299 A1* | 3/2012 | Narasimhan et al. | 370/218 |
| 2012/0134357 A1* | 5/2012 | Ashwood Smith et al. | 370/390 |

* cited by examiner

SYSTEM AND METHOD FOR PRIORITY BASED FLOW CONTROL BETWEEN NODES

This application claims priority to provisional patent application No. 61/502,393, filed Jun. 29, 2011, which is incorporated by reference herein, in its entirety, for all purposes.

BACKGROUND

1. Field of the Invention

The present invention relates generally to network systems and, more particularly, to a system and method for priority-based flow control between nodes.

2. Introduction

Networked systems can include a plurality of nodes that are arranged in a topology that can be discovered. Discovery of the configured topology enables an identification of the particular traffic routing between nodes in the network. For example, the discovered topology enables an identification of the shortest path between two nodes in the network.

One example of a particular network topology is a ring topology. Ring topologies are beneficial in its creation of path redundancy between nodes. While this path redundancy is beneficial in the increased reliability that results, ring topologies can lead to traffic flow control issues due to loops that exist in the network. What is needed therefore is a mechanism that ensures that deadlock issues within a loop topology are prevented while maintaining the best utilization of network resources.

SUMMARY

A system and/or method for priority-based flow control between nodes, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Networked systems typically include redundant links to allow traffic to traverse the network even in the case of a failure in a particular link. Such topologies often result in physical loops. Forwarding trees are used to ensure that traffic does not loop indefinitely within the network system.

Figure 1:
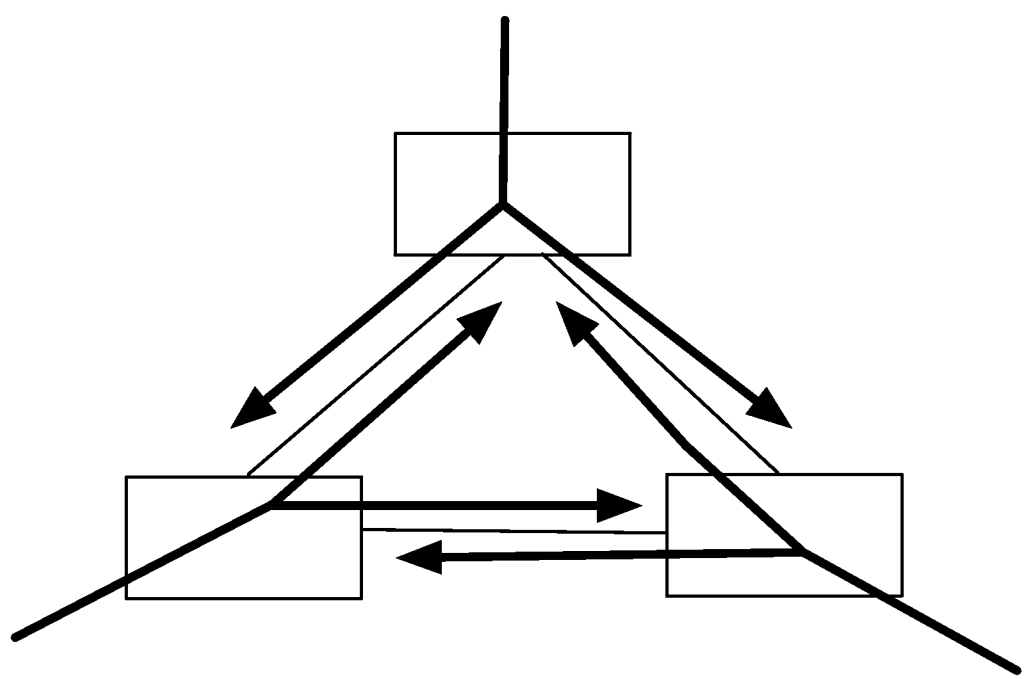
FIG. 1 illustrates an example of a shortest-path-first forwarding in a network.

Shortest-path-first trees are used so that all (or most) of the links are utilized from the overall network perspective and to minimize the number of hops traversed by traffic through the system. The forwarding path for traffic in a shortest-path-first tree is dependent on which node of the networked system the traffic first entered. For a given forwarding tree, certain links are disabled. However, the union of all the forwarding trees in the network system is such that all links are utilized. FIG. 1 illustrates how all links are utilized in a three node ring topology.

With spanning trees, on the other hand, the forwarding paths are the same regardless of which node the traffic entered into the network system. Here, a spanning tree protocol can be used to provide path redundancy while preventing undesirable loops in the network. For a network to function properly, only one active path can exist between two stations.

One disadvantage of spanning trees is that the disabled links are not utilized in the steady state. The disabled links would only be used when a link failure occurs and a redundant path is activated. Consequently, traffic may have to traverse more hops through the network as compared to a shortest-path-first tree.

Figure 2:
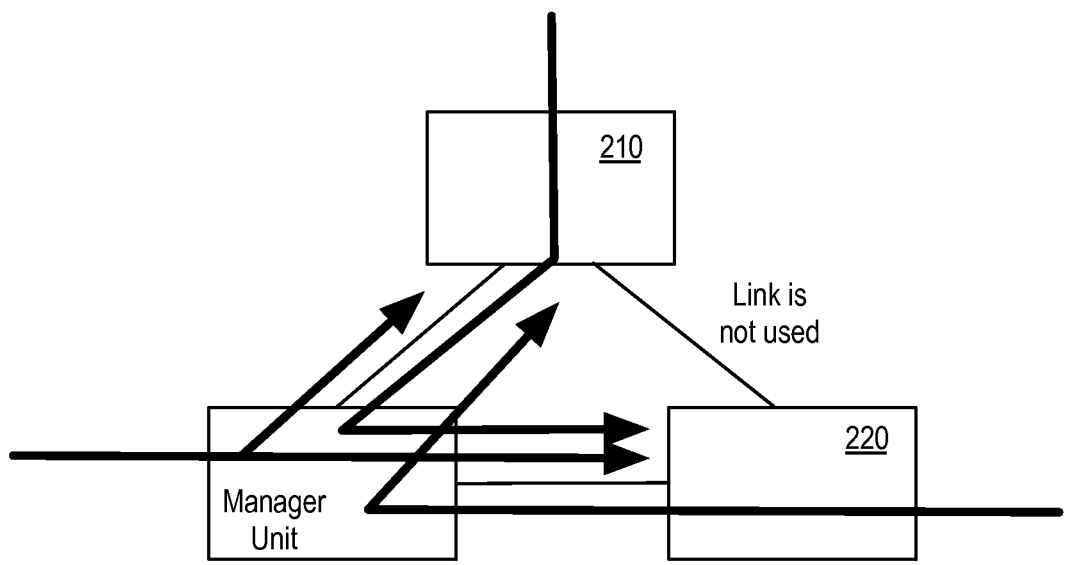
FIG. 2 illustrates an example of spanning-tree forwarding in a network.

FIG. 2 illustrates how one link is disabled in a three-node ring topology. As illustrated, communication between nodes 210 and 220 would traverse a path that includes an additional hop as compared to traversing a direct path using the disabled link.

Figure 3:
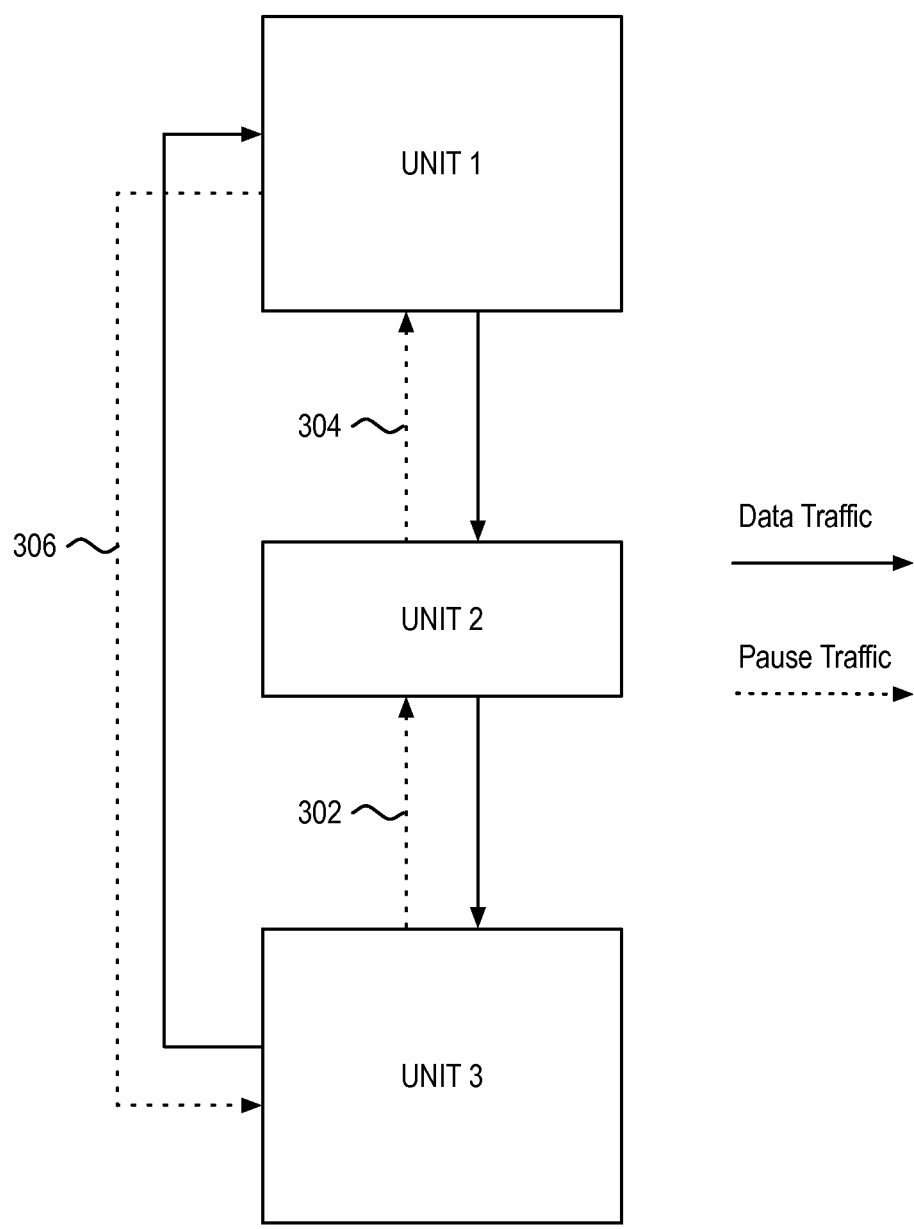
FIG. 3 illustrates an example of a deadlock scenario in a loop topology.

The use of shortest-path-first forwarding trees provides the best utilization of resources within a network system. Unfortunately, deadlock scenarios can result such that no traffic can flow through the system. Consider, for example, a system that consists of three nodes in a ring topology. For simplicity, only one direction of data traffic is shown in the illustration of FIG. 3.

In one scenario, it is possible to get into a state where Unit 3 becomes congested and needs to pause its link partner Unit 2. Unit 3 would then send a PAUSE frame to Unit 2 using communication 302. The receipt by Unit 2 of the PAUSE frame would in turn cause Unit 2 to become congested. Unit 2 would then send a PAUSE frame to Unit 1 using communication 304. The receipt by Unit 1 of the PAUSE frame would in turn cause Unit 1 to become congested. Unit 1 would then send a PAUSE frame to Unit 3 using communication 306.

As this example illustrates, the congestion spreads and the loop topology results in a deadlock where each unit is constantly being paused and constantly pausing its peer. The end result of the pause messages is that no traffic flows through the system.

In the present invention, it is recognized that while deadlock scenarios in a loop topology can be averted using spanning tree technology, such deadlock avoidance comes at the price of decreased utilization of network systems and increased latency of traffic traversing the system. It is therefore a feature of the present invention that priority-based flow control can be used to avert deadlock scenarios in a manner that does not suffer from decreased network utilization and increased latency.

As will be described in greater detail below, priority-based forwarding trees can leverage shortest-path-first forwarding trees and spanning trees in combination. In one embodiment, best-effort traffic within the network system can be accommodated using shortest-path-first forwarding trees, thereby ensuring efficient utilization of network resources, while lossless traffic within the network system can be accommodated using a spanning tree, thereby ensuring a loop-free topology that is not prone to deadlock scenarios.

Figure 4:
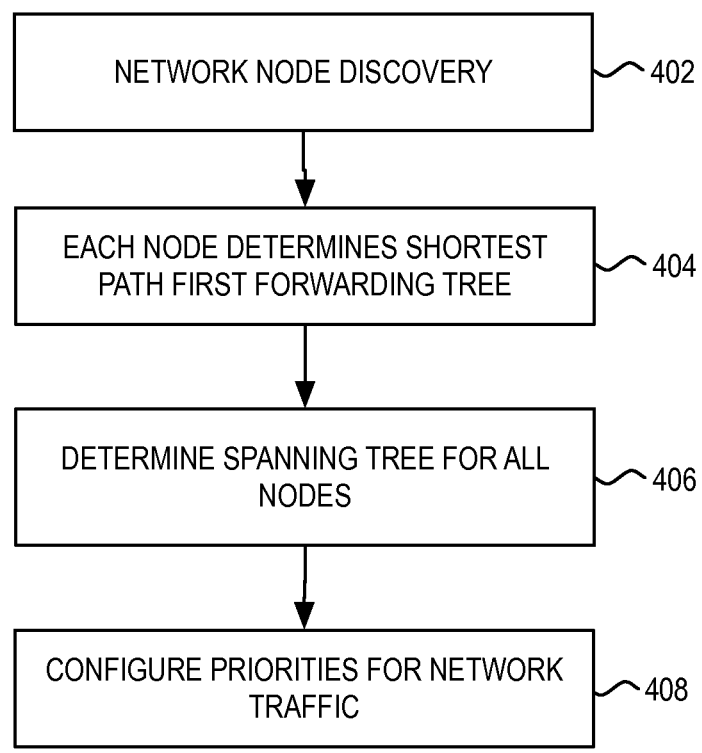
FIG. 4 illustrates a flowchart of a process of setting up a network for priority-based forwarding trees.

To illustrate the features of the present invention, reference is now made to FIG. 4, which illustrates a flowchart of a process of setting up a network to implement priority-based flow control. In this setup process, it is assumed that the network system has a plurality of physically-connected network nodes, each of the network nodes having a unique node ID.

As illustrated, the process begins at step 402 where the nodes in the network system begin an initialization process where each node participates in a discovery process. In this discovery process, each node participates in building a view of all the nodes within the network system and a view of how those nodes are connected to each other. One node can act as the system manager in this process. As would be appreciated, this discovery process can occur automatically or as a result of user configuration. Here, it should be noted that the particular discovery mechanism used would be implementation dependent without departing from the present invention.

At step 404, after a view of all nodes and connections between them have been established, each node can calculate the shortest-path-first forwarding tree that will be used for traffic that enters the network system on that node. Additionally, at step 406, a single spanning tree is calculated for all the nodes such that the root of the tree is the system manager. As would be appreciated, the process steps represented by steps 404 and 406 can be performed independently and need not be strictly sequential.

At step 408, after the shortest-path-first and spanning trees have been determined, a network administrator can then configure a set of priorities to be given lossless treatment in the network system. Configuration of the set of priorities by the network administrator enables the network nodes to identify lossless-priority traffic that is eligible to be paused via priority-based flow control. In one embodiment, this configuration occurs on the system manager and is distributed to all nodes in the network system. After configuration, each node in the network system has enough information to determine the proper forwarding behavior for each packet.

Figure 5:
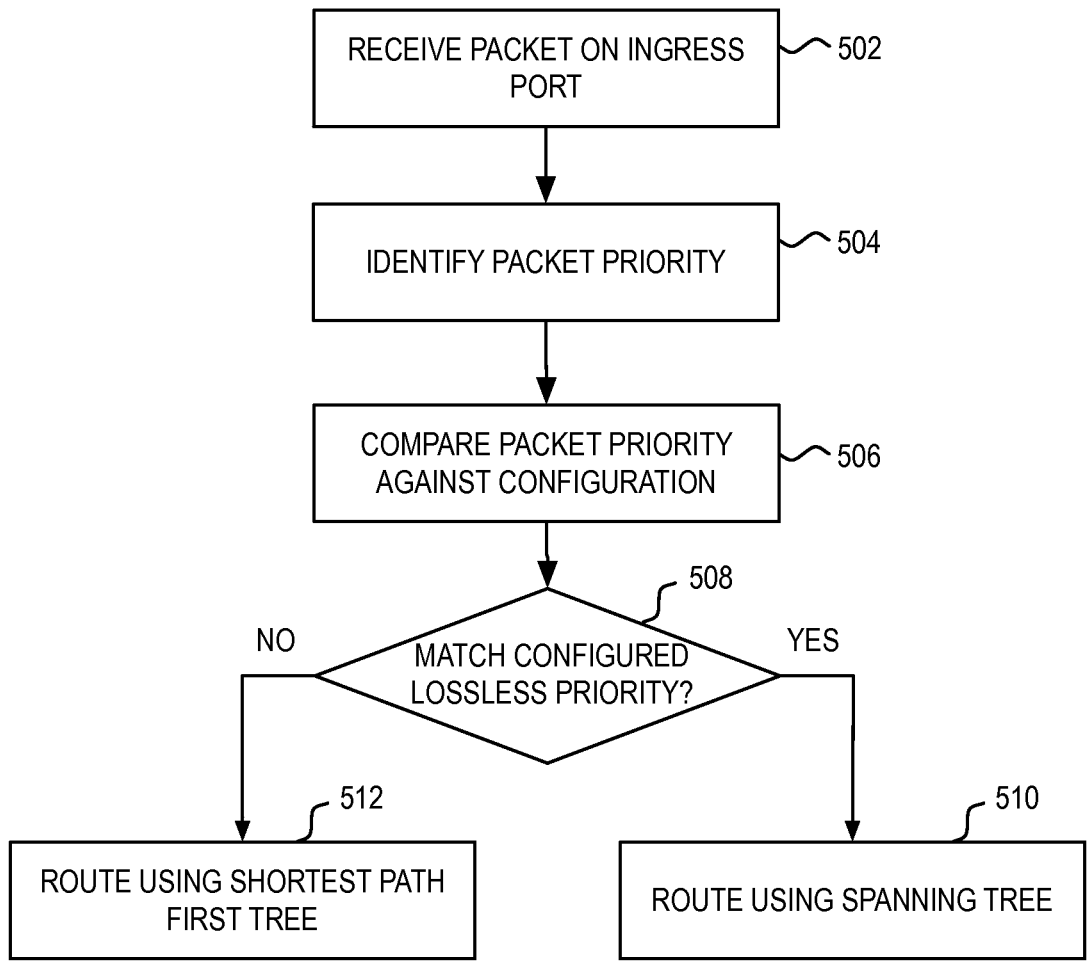
FIG. 5 illustrates a flowchart of a process of priority-based forwarding in a network node.

FIG. 5 illustrates a process within a configured network node for implementing a priority-based flow control process. As illustrated, the process begins at step 502 where a configured network node receives a packet on an ingress port. In general, as each packet enters a given node, processing occurs within the network node to determine the forwarding path. The forwarding path can include one or more egress ports to which the packet will be forwarded. Egress ports can include external ports that are connected to devices that are not part of the network system and internal ports that are connected to other nodes within the network system. Each internal port can belong to a shortest-path-first tree and/or a spanning tree.

If packet processing determines that the packet must be forwarded to other nodes in the system, then the set of egress ports initially includes all internal ports. In the present invention, the forwarding of the received packet by the configured network node to internal ports is dependent on the packet's priority, which is identified at step 504.

The identification of the packet's priority enables an identification of the proper forwarding behavior in accordance with the node's configuration. Here, the identified packet priority is compared, at step 506, against the configuration to determine if any internal egress ports should be removed from the set of egress ports.

In one embodiment, the packet priority can be identified based on the 801.1p priority value within the packet. In other embodiments, the packet priority can be identified based on some other priority value such as that contained in the IP Type of Service (ToS) field, the IP Differentiated Services Code Point (DSCP) field, or the like. As would be appreciated, any field indicative of a relative priority can be used as an input to a comparison relative to configured values.

In one embodiment, it is determined at step 508 whether the packet's priority matches the configured lossless priority. If it is determined at step 508, that the packet's priority does match the configured lossless priority, then the process continues to step 510 where the packet is routed using the spanning tree. In this routing using the spanning tree, the set of internal egress ports is masked such that only the internal ports belonging to the spanning tree remain in the set of internal egress ports.

Here, it should be noted that it is possible that the resulting set of internal egress ports is an empty set, which means that such a packet will not be forwarded to any other nodes in the network system. This scenario can occur, for example, when a packet arrives on an ingress port that is the only internal port belonging to the spanning tree. It should further be noted here that the set of external egress ports is not affected by this process.

On the other hand, if it is determined at step 508, that the packet's priority does not match the configured lossless priority, then the process continues to step 512 where the packet is routed using the shortest-path-first tree. In this routing using the shortest-path-first tree, the set of internal egress ports is masked such that only the internal ports belonging to the shortest-path-first tree remain in the set of internal egress ports.

Here, it should be noted that it is possible that the resulting set of internal egress ports is an empty set, which means that such a packet will not be forwarded to any other nodes in the network system. This scenario can occur, for example, when a packet arrives on an ingress port that is the only internal port belonging to the shortest-path-first tree. Again, the set of external egress ports is not affected by this process.

Figure 6:
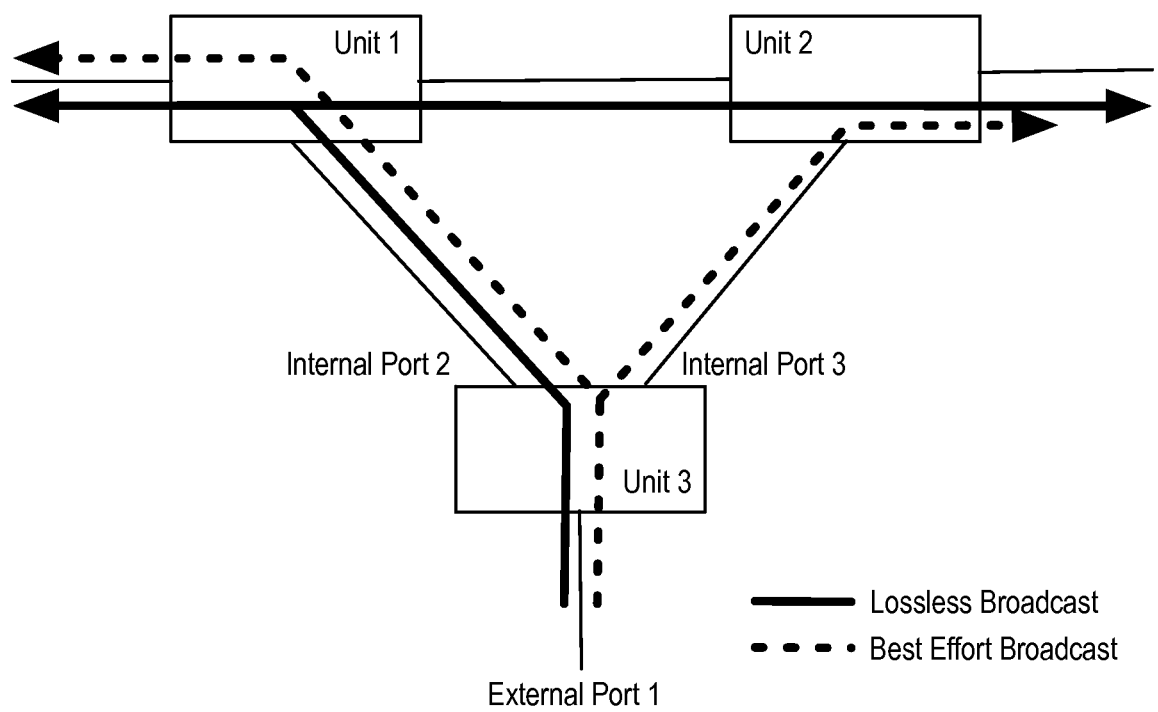
FIG. 6 illustrates an example of priority-based forwarding in a network

FIG. 6 illustrates an example of priority-based flow control for broadcast traffic received on Unit 1 in a three-node ring topology. As illustrated, when the packet ingresses external port 1 on Unit 1, the packet processing would initially determine whether the packet should be forwarded. If the packet processing determines that the packet must be forwarded to other nodes in the system, then the set of egress ports initially includes all of Unit 3's internal ports (i.e., internal ports 2 and 3).

The packet processing would then identify the packet priority, using, for example, the priority value contained within the received packet. If the packet processing determines that the identified packet priority matches a configured lossless priority, then the received packet will be routed using a spanning tree. As illustrated in FIG. 6, the spanning tree that is applied to a configured lossless priority has disabled the link between Unit 2 and Unit 3. As such, the packet processing would apply the spanning tree to the initial set of internal egress ports by masking the initial set of internal egress ports such that only the internal egress ports belonging to the spanning tree remain in the set of internal egress ports. Specifically, the initial set of internal egress ports (i.e., internal ports 2 and 3) would be masked such that only internal port 2 would remain in the set. The result from such a masking is that the received packet would only be forwarded to internal port 2 (as well as any external egress ports that may exist on Unit 3).

Conversely, if the packet processing determines that the identified packet priority does not match the configured lossless priority, then the received packet will be routed using a shortest-path-first tree. As illustrated in FIG. 6, the shortest-path-first tree includes both internal port 2 and internal port 3. As such, the packet processing would apply the shortest-path-first tree to the initial set of internal egress ports by masking the initial set of internal egress ports such that only the internal egress ports belonging to the shortest-path-first tree remain in the set of internal egress ports. Specifically, no ports are removed from the initial set of internal egress ports because both internal ports 2 and 3 belong to the shortest-path-first tree. In this case the packet is forwarded to both internal ports 2 and 3 (as well as any external egress ports that may exist on Unit 3).

As has been described, the present invention allows for the advantages of shortest-path-first trees for traffic that is not susceptible to pause deadlocks, while taking advantage of the loop-free nature of spanning trees to prevent pause deadlocks for traffic. In general, the principles of the present invention may also provide benefits for any scenario or environment that can benefit from using different forwarding tree algorithms for different traffic based on traffic priority.

The priority-based selection of forwarding trees represents one example of priority-based flow control between nodes and is not intended to be limiting on the scope of the present invention. More generally, a set of network nodes can be configured to collectively implement any flow control scheme that is dependent on traffic priority.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A priority based flow control method in a network node, comprising:
   receiving a packet on an internal ingress port of said network node;
   identifying a packet priority of said received packet, wherein said identifying comprises identifying a packet priority using a differentiated services code point field in said received packet;
   selecting a forwarding tree to apply to said received packet from a set of forwarding trees that includes a spanning tree and a shortest path first tree, wherein said selection is based on said identified packet priority, said spanning tree identifying a first set of other network nodes for further forwarding processing of said received packet, and said shortest path first tree identifying a second set of other network nodes for further forwarding processing of said received packet; and
   forwarding said received packet to a set of internal egress ports for transmission to one of said first set and second set of other network nodes for further forwarding processing of said received packet, said set of internal egress ports determined based on said selected forwarding tree.

2. The method of claim 1, wherein said forwarding comprises forwarding using a spanning tree.

3. The method of claim 1, wherein said forwarding comprises forwarding using a shortest path first tree.

4. A priority based flow control method in a network node, comprising:
   receiving a packet on an internal ingress port of said network node;
   identifying a packet priority of said received packet;
   identifying an initial set of internal egress ports to which said received packet is to be forwarded;
   modifying said set of initial internal egress ports based on a selection of one of a set of forwarding trees that includes a spanning tree and a shortest path first tree, said spanning tree identifying a first set of other network nodes for further forwarding processing of said received packet, and said shortest path first tree identifying a second set of other network nodes for further forwarding processing of said received packet, wherein said selection is based on said identified packet priority, wherein said modifying comprises modifying said set of initial internal egress ports based on a selection of said shortest path first tree from said set of forwarding trees; and
   forwarding said received packet to said modified set of said internal egress ports for transmission to said second set of other network nodes for further forwarding processing of said received packet.

5. The method of claim 4, wherein said identifying a packet priority comprises identifying a packet priority using a type of service field in said received packet.

6. The method of claim 4, wherein said identifying a packet priority comprises identifying a packet priority using a differentiated services code point field in said received packet.

7. A network device, comprising:
   a plurality of ingress ports;
   a plurality of egress ports; and
   a packet processor that is configured to implement a priority based flow control process based on traffic priority configuration information received from a system manager device, said priority based flow control process enabling said network device to identify a packet priority of a packet received on one of said plurality of ingress ports, select one of a plurality of forwarding trees for application to said received packet based on said identified packet priority, wherein said plurality of forwarding trees includes a spanning tree that identifies a first set of other network nodes for further forwarding processing of said received packet, and a shortest path first forwarding tree that identifies a second set of other network nodes for further forwarding processing of said received packet, and forward said received packet to one or more of said plurality of egress ports for transmission to one of said first set and said second set of other network nodes for further forwarding processing of said received packet, said plurality of egress ports determined based on said selected one of said plurality of forwarding trees.

8. The network device of claim 7, wherein said packet priority is identified using a type of service field in said received packet.

9. The network device of claim 7, wherein said packet priority is identified using a differentiated services code point field in said received packet.

10. The network device of claim 7, wherein said received packet is forwarded using a spanning tree.

11. The network device of claim 7, wherein said received packet is forwarded using a shortest path first tree.

\* \* \* \* \*